E. P. NOYES.
INTERNAL COMBUSTION STEAM MOTOR.
APPLICATION FILED FEB. 23, 1907.
982,850.
Patented Jan. 31, 1911.
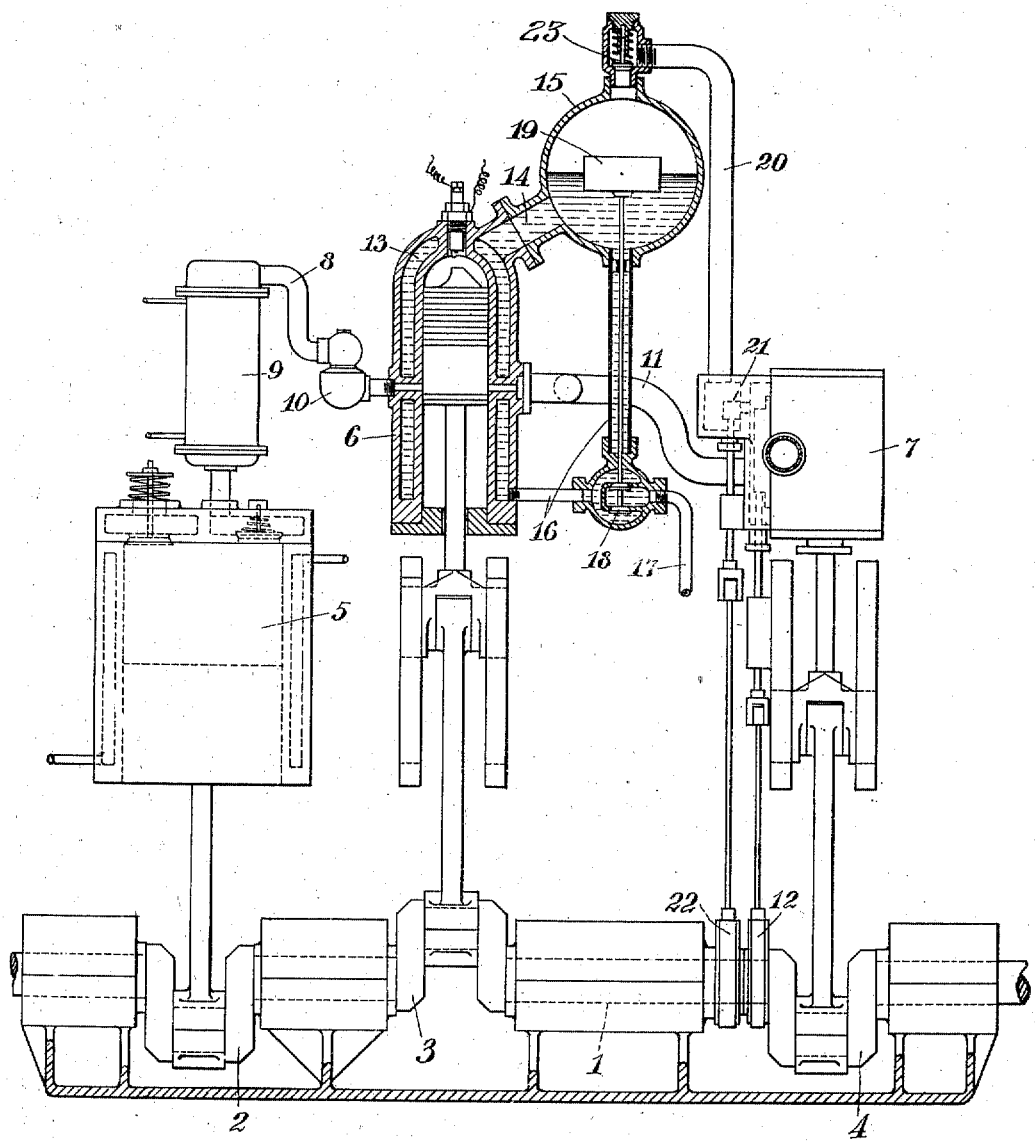
Witnesses:
G. Blake
H. R. Schulz
Inventor:
E. P. Noyes
by Robert M. Pierson
atty.

UNITED STATES PATENT OFFICE.

EDWARD P. NOYES, OF WINCHESTER, MASSACHUSETTS, ASSIGNOR, BY MESNE ASSIGNMENTS, TO C. P. POWER COMPANY, OF NEWARK, NEW JERSEY, A CORPORATION OF NEW JERSEY.

INTERNAL-COMBUSTION STEAM-MOTOR.

982,850.  Specification of Letters Patent.  Patented Jan. 31, 1911.

Application filed February 23, 1907. Serial No. 358,791.

*To all whom it may concern:*

Be it known that I, EDWARD P. NOYES, a citizen of the United States, residing at Winchester, in the county of Middlesex and State of Massachusetts, have invented certain new and useful Improvements in Internal-Combustion Steam-Motors, of which the following is a specification.

This invention relates to internal-combustion engines of the explosive or other intermittent-combustion type, and more especially to those operating under very high maximum pressures which are expanded down by stages in a plurality of working-chambers or cylinders.

The object of the invention is to utilize a considerable portion of the heat which passes out through the walls of the combustion-chamber, and to this end I preferably provide the high-pressure or explosion-cylinder with a water-jacket having a steam space from which the steam generated by the heat of the exploded charge is led into the same low-pressure engine in which the burned gases discharged from the explosion-engine are expanded. In the steam line from the water-jacket to the low-pressure engine, I propose to use a suitable pressure-controlled device, such as a check-valve, which will permit the passage of the steam only when the latter has attained the requisite pressure, and I may also employ a separate cut-off valve for the steam entering the low-pressure engine in order that said steam may act expansively.

The accompanying drawing illustrates in a diagrammatic fashion a motor apparatus embodying my invention.

1 is a crank-shaft having three cranks, 2, 3, 4, connected respectively with the pistons of a low-pressure charging air-compressor 5, a high-pressure explosion-cylinder 6 and a low-pressure expansion-cylinder 7. The high-pressure engine as shown is of the two-cycle internal-compression type, and is charged from the compressor 5 by way of a pipe 8 in which is an intercooler 9 to suppress compression-temperature for the prevention of preignition, and a carbureter 10 to render the charge combustible. A conduit 11 carries the exhaust gases under considerable pressure from the explosion-cylinder 6 to the low-pressure cylinder 7, which latter is of the steam-engine type, although I consider it preferable, when this engine is direct-connected to the shaft 1 as shown, to provide it with a valve mechanism which admits the exhaust gases to the cylinder 7 throughout the whole or a fixed part of the stroke of its piston. Any suitable type of steam-engine valve may be provided for the purpose and it will be unnecessary to refer in detail to this feature. It will also be understood that the gases entering cylinder 7 may, if desired, receive a variable cut-off analogous to the practice in steam-engines. 12 is an eccentric for operating the valve for admitting the burned gases and exhausting the contents of the cylinder on the back-stroke.

13 is the water-jacket of the explosion-cylinder 6 extended through a short pipe 14 into a steam-and-water drum 15 which has a return-circulating connection with the bottom of the jacket by means of a downtake conduit 16. Water is pumped into the jacket under pressure through a pipe 17 under control of a feed-valve 18 which is operated by a float 19 in the drum 15 so as to maintain the water at a substantially constant level and establish a steam space above its surface in the drum 15. Automatic regulation of the water-level is of course not essential though very desirable. A steam-pipe 20 carries steam from the drum 15 into the valve-chest of the low-pressure expansion-cylinder 7 and I prefer to employ a separate steam cut-off valve 21 operated by an eccentric 22 in order that the steam may be used expansively. This valve may be governed in any suitable way in accordance with current steam-engine practice. Steam having greater heat-capacity and a slower pressure-drop in the cylinder than dry gases, it is preferred to have separately-controlled valves for the two as shown, although obviously this is not essential since both steam and gases may be controlled and cut off by the same valve mechanism. I further employ a check-valve 23 in the steam-pipe 20 which opens whenever the passage to the cylinder 7 is clear and when the steam has acquired a pressure slightly above the pressure of the gases in said chest coming from the explosion-cylinder 6.

An explosive engine organized on the compound principle above set forth is enabled to attain very high maximum explosion pressures which make it advisable to conduct the expansion process and preferably also the compression process in a plurality of stages as set forth, and this fact I have profitably employed in order to make use of the heat which would otherwise escape through the walls of the explosion-cylinder, the idea being carried out by boiling the jacket-water and carrying the steam into the same low-pressure cylinder or engine with the products of combustion, the manner whereof has been made evident by the foregoing description. It may be mentioned that the hot gases mixing with the steam which enters the low-pressure cylinder have a tendency to superheat said steam and prevent condensation in said cylinder. It will be evident without special illustration that any portion of the exhaust-conduit 11 leading between the low-pressure and high-pressure expansion-cylinders may be included within the water-jacket of the high-pressure cylinder, and I may include in the water-circuit the water-jacket of the compressor 5 or a water-jacket provided on the cylinder 7. I have not illustrated such modification, however, since it is unnecessary ordinarily to include these jackets.

The compound explosive cycle and apparatus for performing the same as set forth are not herein claimed apart from the combination thereof with a jacket boiler. This latter combination and its described accessories form the subject of my present invention.

I am aware that it is not new to boil the water in the jacket of a combustion cylinder and cause the resulting steam to perform work either in the same cylinder or in an added low-pressure cylinder, and I do not claim novelty for this idea in a broad sense. Heretofore however I believe that all such proposals have either failed to substantially increase the efficiency or have required extra cylinders, condensers, etc., not essential to the economical performance of the dry-gas cycle and usually if not always overbalancing in extra cost and weight the slight theoretical gain in efficiency. Furthermore, such engines, when of the type which mixes the steam and gases, have commonly been obliged to use the steam through only a small pressure-range.

The novelty of my invention consists principally in combining the steam cycle with an internal-combustion cycle which will permit the steam to expand to or nearly to atmospheric pressure from an initial admission pressure (namely that of the low-pressure engine) well above the atmospheric, and in generating the steam with heat which flows through the jacket walls and would otherwise go to waste. It therefore requires the steam and gases to be used together in a low-pressure engine after said gases have performed all the work of which they are capable in the high-pressure combustion-cylinder, and it also requires that the high-pressure motor shall be capable of exhausting against a substantial back-pressure in order that the steam may be used at an initial pressure which will give an economical degree of expansion thereto. From these considerations it follows that my invention in its preferred and most desirable embodiment employs an explosion cylinder having means for compressing into its combustion space a charge which initially (that is at atmospheric pressure) exceeds the volume of the combustion cylinder itself. The number of cylinders is only such as would be essential to the economical performance of the dry-gas cycle itself, but owing to the use of jacket-generated steam the efficiency of the combined cycle is quite considerably augmented.

I claim:—

1. In a combined explosive and steam motor, the combination of compressing and exploding devices having means for compressing the combustible charge in stages, and including a high-pressure working explosion cylinder, a steam-generator jacketing said cylinder and heated thereby, said generator having a water inlet, and a steam outlet leading to the low-pressure motor, means for establishing the water-line in said generator below said steam outlet, and a low-pressure motor connected to receive at considerable pressure and further expand as a mixture the exhaust gases and steam from said high-pressure cylinder and generator respectively.

2. A combined explosive and steam motor comprising a high-pressure explosion cylinder, a steam-generator jacketing said cylinder and heated thereby, said generator having a water inlet and a steam outlet, means for establishing the water-line in said generator below said steam outlet, a compressor of greater volumetric capacity than said explosion cylinder for charging the latter under pressure, and a low-pressure motor connected to receive the exhaust of said high-pressure cylinder and also connected to the steam-outlet of said generator, whereby said low-pressure motor receives at considerable pressure and expands a mixture of hot gases and steam.

3. The combination of an intermittent-combustion engine cylinder, a steam-generator jacketing said cylinder and heated thereby, a low-pressure engine operated by the exhaust from said cylinder, a conduit connecting the steam space of the generator with the low-pressure engine, and a pressure-controlled valve in said conduit adapted to open a steam-passage therethrough when the steam pressure is sufficient to overcome the pressure of the burned gases from the combustion-cylinder.

4. A compound internal-combustion motor comprising a high-pressure combustion-engine, a low-pressure expansion-engine, a conduit for conducting the burned gases between the two, a steam-generator forming a water-jacket for the high-pressure engine and heated thereby, a steam conduit connecting said generator with the low pressure engine, and a cut-off valve mechanism in said steam conduit operated by the low-pressure engine.

In testimony whereof I have hereunto set my hand in the presence of two subscribing witnesses, the 16th day of February, 1907.

EDWARD P. NOYES.

Witnesses:
ARTHUR H. BROWN,
A. C. RATIGAN.